US012746693B2

(12) United States Patent
Hsu

(10) Patent No.: US 12,746,693 B2
(45) Date of Patent: Sep. 29, 2026

(54) GRIPPER BASE AND GRIPPER SYSTEM

(71) Applicant: Delta Electronics, Inc., Taoyuan City (TW)

(72) Inventor: Chih-Ming Hsu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 745 days.

(21) Appl. No.: 18/180,611

(22) Filed: Mar. 8, 2023

(65) Prior Publication Data

US 2023/0294304 A1 Sep. 21, 2023

(30) Foreign Application Priority Data

Mar. 17, 2022 (CN) ......................... 202210266209.7

(51) Int. Cl.
*B25J 15/04* (2006.01)
*B25J 15/00* (2006.01)

(52) U.S. Cl.
CPC ....... *B25J 15/0491* (2013.01); *B25J 15/0028* (2013.01); *B25J 15/0441* (2013.01)

(58) Field of Classification Search
CPC .... B25J 15/0028; B25J 15/04; B25J 15/0408; B25J 15/0416; B25J 15/0433; B25J 15/0491; F16B 7/04; F16B 7/0406; F16B 7/0413; F16B 7/042; E05C 19/02; E05C 19/022; E05C 19/024; E05C 19/028
See application file for complete search history.

(56) References Cited

U.S. PATENT DOCUMENTS 5,217,262 A * 6/1993 Kurosaki .............. E05C 19/022 292/6
5,273,328 A * 12/1993 Kurosaki .............. E05C 19/022 292/336.3
5,401,067 A * 3/1995 Kurosaki .................. E05C 5/00 292/DIG. 4
5,492,414 A * 2/1996 Gilbert .................. F16C 29/005 384/49
7,393,026 B2 * 7/2008 Ikeda ...................... E05C 19/02 292/341.15

(Continued)

FOREIGN PATENT DOCUMENTS

CA 2743055 A1 * 12/2012 ........... E05C 19/022
DE 102009039104 A1 * 3/2011 .......... B25J 15/0475

(Continued)

*Primary Examiner* — Jonathan P Masinick
(74) *Attorney, Agent, or Firm* — Muncy, Geissler, Olds & Lowe, P.C.

(57) ABSTRACT

A gripper base is provided, including a housing, a movable member, an elastic member, a position restricting mechanism, a guiding rod, and an engaging member. The elastic member is connected to the housing and the movable member. The position restricting mechanism is disposed on the movable member, and includes a groove and a block, wherein the groove surrounds the block. The groove has a top surface, and the block has an upper surface facing the top surface. The top surface has a protrusion protruding toward the block, and the upper surface has a concave structure. One end of the guiding rod is pivotally connected to the housing, and the other end of the guiding rod enters the groove. The engaging member is pivotally connected to the movable member.

13 Claims, 15 Drawing Sheets

(56) References Cited

U.S. PATENT DOCUMENTS

| | | | | | |
|---|---|---|---|---|---|
| 8,925,986 | B2 * | 1/2015 | Maffeis | B25J 15/026 | 901/38 |
| 9,272,422 | B2 * | 3/2016 | Matsuoka | B25J 15/0028 | |
| 10,024,087 | B2 * | 7/2018 | Nakashima | E05B 77/06 | |
| 10,525,603 | B2 * | 1/2020 | Tomuta | B25J 15/04 | |
| 10,773,392 | B2 * | 9/2020 | Bright | B25J 9/0015 | |
| 11,141,865 | B1 * | 10/2021 | Fujitake | B25J 15/0253 | |
| 11,235,455 | B2 * | 2/2022 | Lee | B25J 3/00 | |
| 11,235,475 | B2 * | 2/2022 | Kayama | B25J 15/0475 | |
| 11,554,503 | B2 * | 1/2023 | Yen | B25J 15/045 | |
| 12,263,576 | B2 * | 4/2025 | Kim | B25J 19/023 | |
| 2006/0261606 | A1 * | 11/2006 | Bella | B60R 7/02 | 292/304 |
| 2018/0029221 | A1 * | 2/2018 | Tanaka | B25J 9/0081 | |
| 2021/0268646 | A1 * | 9/2021 | Wakana | B25J 19/023 | |
| 2024/0123630 | A1 * | 4/2024 | Lee | B25J 15/0052 | |

FOREIGN PATENT DOCUMENTS

| | | | | | |
|---|---|---|---|---|---|
| DE | 102020211768 | A1 * | 3/2022 | B25J 15/0475 |
| EP | 0477863 | A1 * | 4/1992 | G11B 33/04 |
| GB | 2134961 | A * | 8/1984 | E05C 19/022 |
| KR | 100797575 | B1 * | 1/2008 | E04F 19/083 |
| KR | 100814358 | B1 * | 3/2008 | F25D 23/02 |
| KR | 100911950 | B1 * | 8/2009 | E05C 19/02 |
| KR | 101063632 | B1 * | 9/2011 | E05C 19/022 |
| TW | 458768 | U * | 8/2013 | |
| WO | WO-2017051446 | A1 * | 3/2017 | B25J 13/08 |

* cited by examiner

GRIPPER BASE AND GRIPPER SYSTEM

CROSS REFERENCE TO RELATED APPLICATIONS

This application claims the benefit of China Patent Application No. 202210266209.7, filed Mar. 17, 2022, the entirety of which is incorporated by reference herein.

BACKGROUND OF THE INVENTION

Field of the Invention

The application relates in general to a gripper system, and in particular, to a gripper system that can replace a claw flake.

Description of the Related Art

In the process of manufacturing electronic products, robot arms may be employed to deploy a gripper to grab and move electronic components. Since various electronic components may be included in a single electronic product, different types of grippers may be needed. Current apparatuses have replaceable grippers, but their mechanical design and circuit design are complicated. To affix the gripper securely, the aforementioned apparatuses need to occupy a large space. Also, the gripper cannot be changed rapidly and efficiently. Therefore, how to address these problems has become an important issue.

BRIEF SUMMARY OF INVENTION

To address the deficiencies of conventional products, an embodiment of the invention provides a gripper base, including a housing, a movable member, an elastic member, a position restricting mechanism, a guiding rod, and an engaging member. The elastic member is connected to the housing and the movable member. The position restricting mechanism is disposed on the movable member, and includes a groove and a block, wherein the groove surrounds the block. The groove has a top surface, and the block has an upper surface facing the top surface. The top surface has a protrusion protruding toward the block, and the upper surface has a concave structure. One end of the guiding rod is pivotally connected to the housing, and the other end of the guiding rod enters the groove. The engaging member is pivotally connected to the movable member.

In some embodiments, the protrusion has a top end, the concave structure has a bottom end, and the movable member is movable along a first axis relative to the housing, wherein as seen from the first axis, a distance is formed between the top end and the bottom end.

In some embodiments, the protrusion has a first bottom end and a second bottom end, and the movable member is movable along a first axis relative to the housing, wherein as seen from the first axis, the first bottom end overlaps the concave structure, and the second bottom end is separated from the concave structure. The groove has an inclined surface that is connected to the first bottom end and inclined relative to a second axis, and the second axis is substantially perpendicular to the first axis.

In some embodiments, the block further comprises a lower surface opposite to the upper surface, and the movable member is movable along a first axis relative to the housing, wherein the lower surface is inclined relative to a second axis, and the second axis is substantially perpendicular to the first axis.

In some embodiments, the gripper base further comprises a driving member disposed on the housing. When the guiding rod is in a first position of the groove, the engaging member is at a closed angle relative to the housing. When the guiding rod moves from the first position to a second position of the groove, the driving member contacts and pushes the engaging member, and the engaging member rotates from the closed angle to an open angle. The concave structure has a bottom end, and when the guiding rod is in the second position of the groove, the guiding rod is in contact with the concave structure and adjacent to the bottom end.

In some embodiments, the gripper base further comprises a guiding member, disposed on the housing and having a guiding slot. The movable member has a sliding portion, slidably disposed in the guiding slot.

In some embodiments, the gripper base further comprises a plurality of balls, and the balls are in contact with the movable member and the sliding portion.

A gripper system is also provided, including the aforementioned gripper base, a gripper device, a first connecting member, a claw flake, and a second connecting member. The claw flake has a protruding portion. The first connecting member and the second connecting member are respectively disposed on the gripper device and the claw flake, and the claw flake is detachably connected to the gripper device via a magnetic attracting force between the first connecting member and the second connecting member. When the gripper device brings the claw flake to move toward the gripper base along a first axis, the claw flake contacts and pushes the engaging member from an open angle to a closed angle, and the engaging member affixes the claw flake to the gripper base.

In some embodiments, when the engaging member affixes the claw flake to the gripper base, and the gripper device moves away from the gripper base, the claw flake is separated from the gripper device.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the gripper base and the gripper system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as "beneath," "below," "lower, above, upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
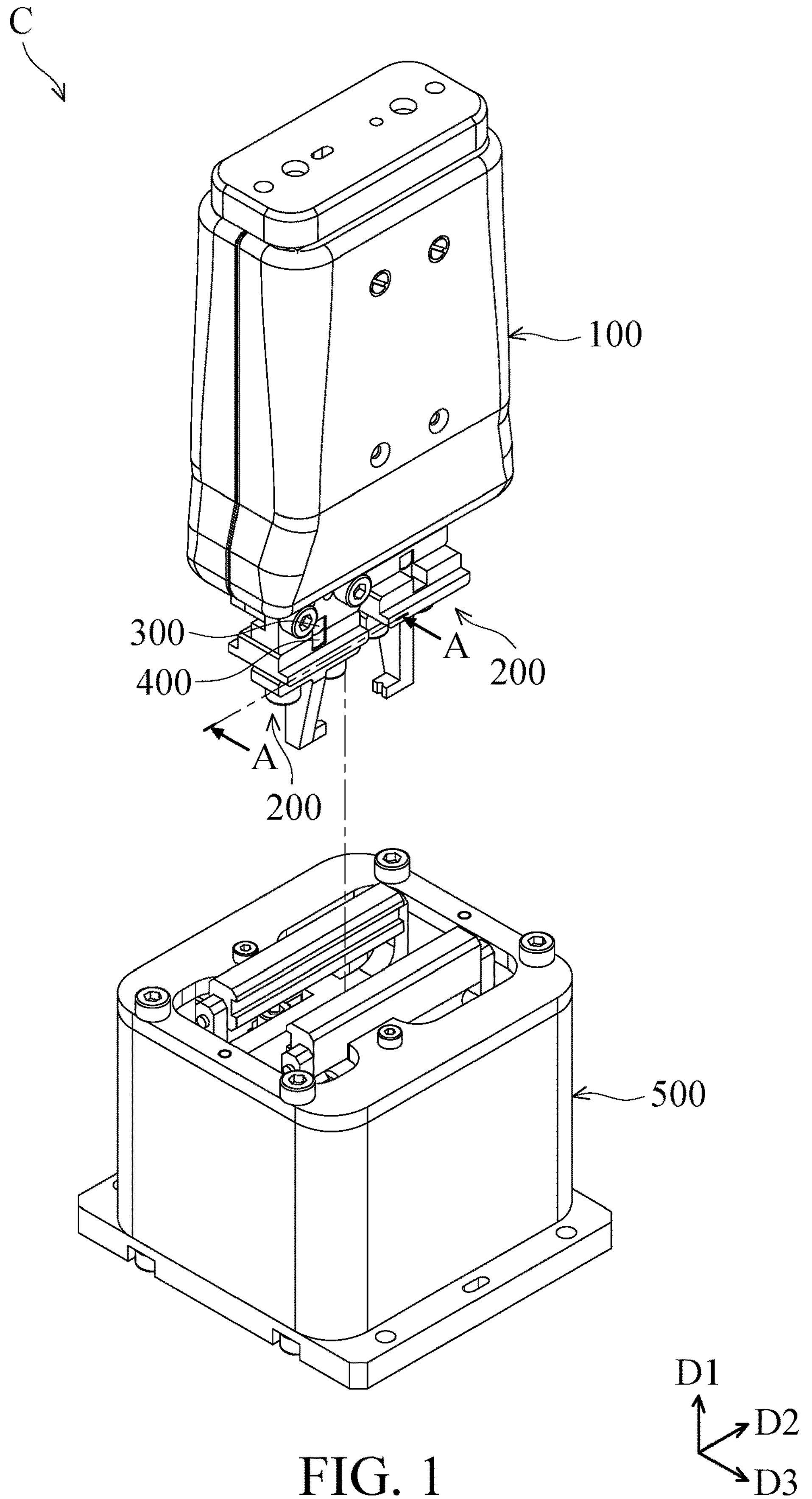
FIG. 1 is a schematic diagram of a gripper system according to an embodiment of the invention.

FIG. 1 is a schematic diagram of a gripper system C according to an embodiment of the invention. As shown in FIG. 1, the gripper system C primarily includes a gripper device 100, at least one claw flake 200, at least one first connecting member 300, at least one second connecting member 400, and a gripper base 500. The gripper device 100 can be a robot arm or a linear motor, but it is not limited thereto.

The claw flake 200 can be detachably connected to the gripper device 100 along a first axis D1. Therefore, when the gripper device 100 moves, the claw flake 200 is driven to move with the gripper device 100 together. Thus, the claw flake 200 can move to a desired position to contact and grab an object that the user wants to grab (take an instance, various electronic components, such as a chip, a resistor, and/or a capacitor).

Specifically, the first connecting member 300 can be disposed on the gripper device 100, and the second connecting member 400 can be disposed on the claw flake 200. Therefore, when the gripper device 100 and the claw flake 200 are connected to each other, they can be affixed to each other by the magnetic attracting force between the first connecting member 300 and the second connecting member 400. For example, both the first connecting member 300 and the second connecting member 400 can be magnets with magnetic property. Otherwise, one of the first connecting member 300 and the second connecting member 400 can be a magnet with magnetic property, and the other one can be an iron sheet without magnetic property.

Figure 2:
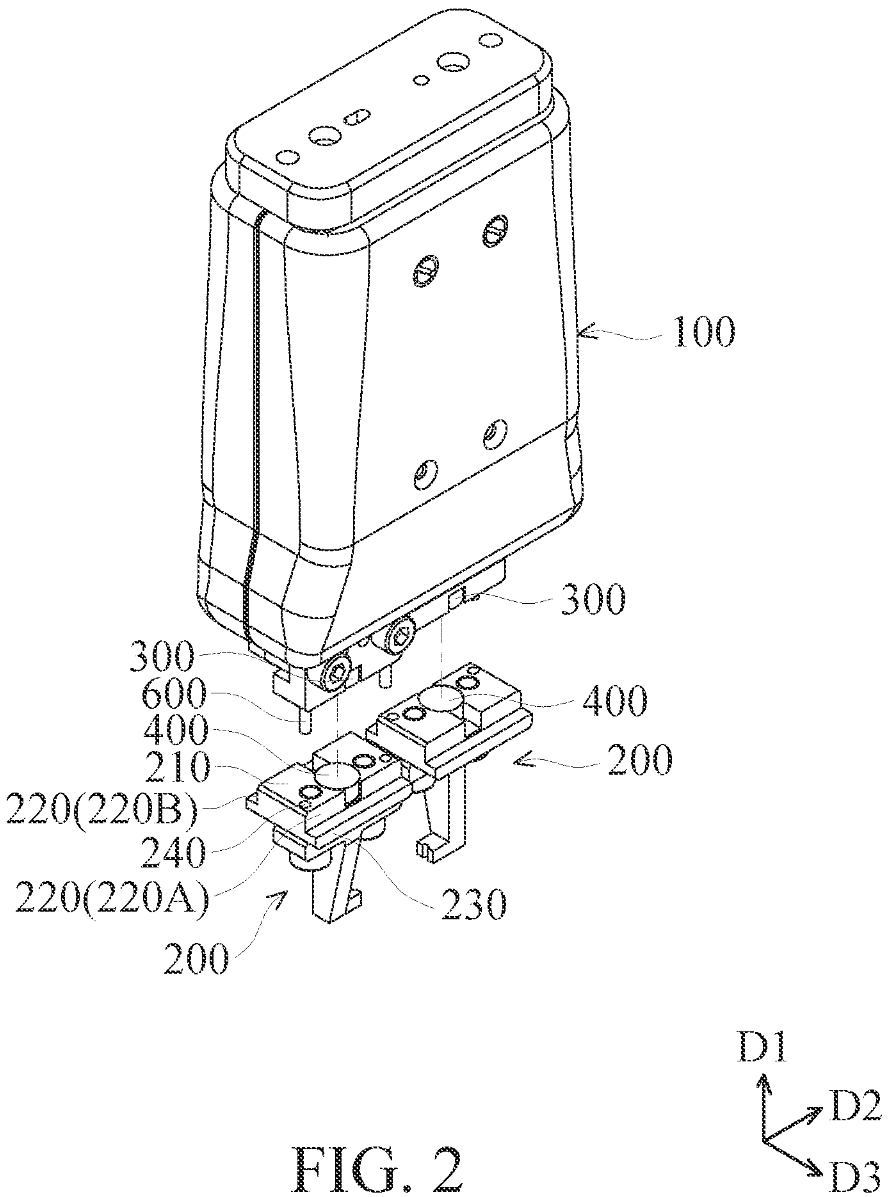
FIG. 2 is a schematic diagram of a gripper device and at least one claw flake according to an embodiment of the invention.

Referring to FIG. 2, the claw flake 200 includes a top surface 210, a plurality of lateral surfaces 220, and at least one protruding portion 230. The top surface 210 faces the gripper device 100, the lateral surfaces 220 are connected to the top surface 210, and the normal direction of the top surface 210 is different from the normal direction of each of the lateral surfaces 220. The normal direction of each of the lateral surfaces 220 is different from the first axis D1. The protruding portion 230 is disposed on at least one of the lateral surfaces 220, and protrudes therefrom. In this embodiment, the claw flake 200 includes two protruding portions 230 respectively protruding from two lateral surfaces 220 on the opposite sides of the claw flake 200, and the aforementioned two lateral surfaces 220 are arranged along a third axis D3 that is perpendicular to the first axis D1.

Figure 3:
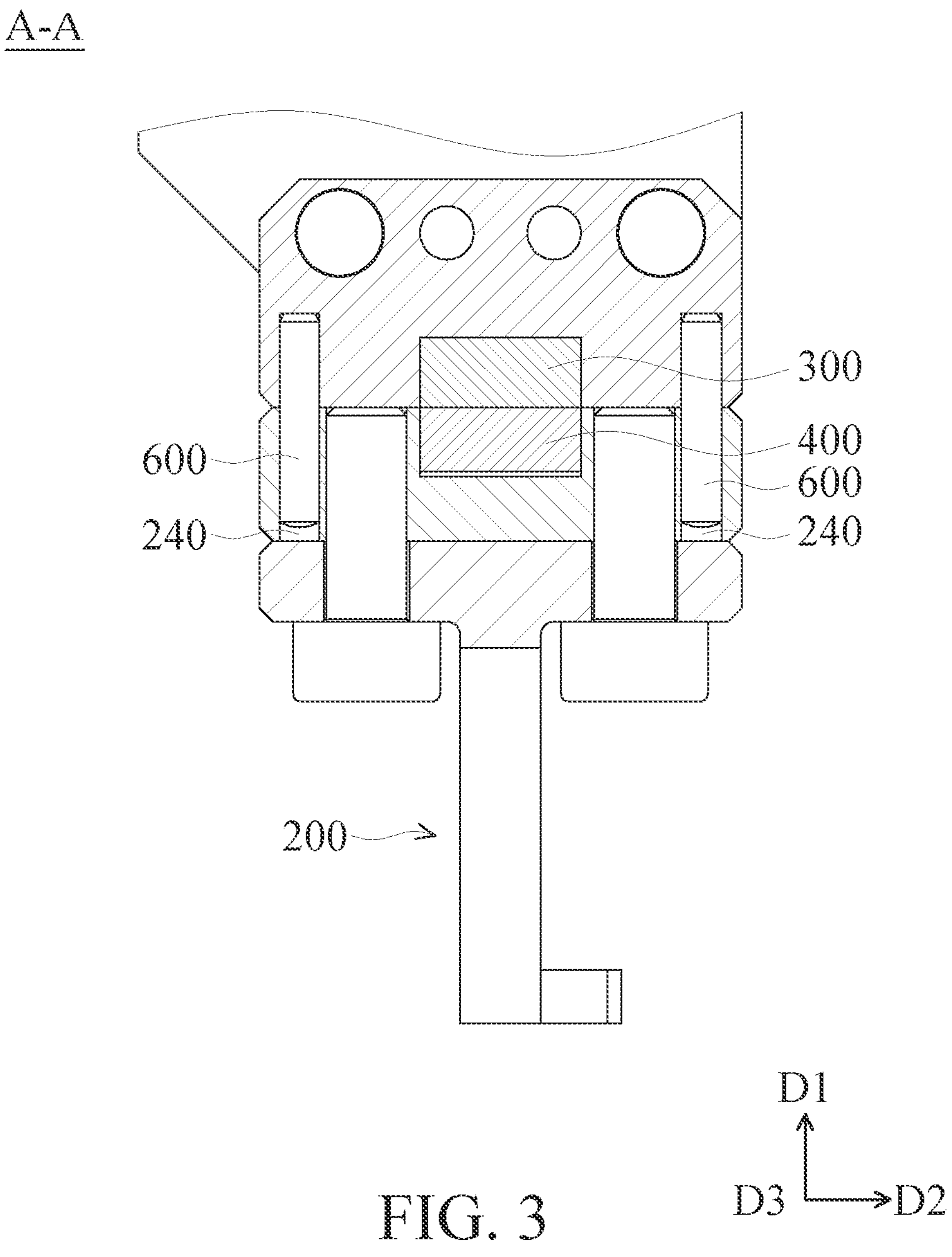
FIG. 3 is a cross-sectional view taken along the line A-A in FIG. 1.

As shown in FIG. 2 and FIG. 3, the gripper system C can further include at least one first positioning structure 600, and the claw flake 200 can include at least one second positioning structure 240 corresponding to the first positioning structure 600. When the gripper device 100 is connected to the claw flake 200, the first positioning structure 600 and the second positioning structure 240 can be engaged to each other, so as to guide the claw flake 200 to a predetermined connecting position. For example, the first positioning structure 600 can be a pillar, and the second positioning structure 240 can be a recess. Thus, when the gripper device 100 is connected to the claw flake 200, the first positioning structure 600 can be accommodated in the second positioning structure 240. In some embodiments, the first positioning structure 600 is a recess, and the second positioning structure 240 is a pillar.

In this embodiment, two second positioning structures 240 are disposed on the claw flake 200, and the gripper C includes two first positioning structures 600. The first connecting member 300 is disposed between two first positioning structures 600, and the second connecting member 400 is disposed between two second positioning structures 240.

Moreover, in this embodiment, the gripper system C includes a plurality of claw flakes 200, and the second connecting members 400 on the claw flakes 200 are adjacent to the different lateral surfaces 220 to prevent interfering each other. In detail, each of the claw flakes 200 includes a lateral surface 220A and a lateral surface 220B, and the lateral surface 220A and the lateral surface 220B face the opposite directions. The second connecting member 400 on one of the claw flakes 200 is adjacent to the lateral surface 220A, and the second connecting member 400 on the other one of the claw flakes 200 is adjacent to the lateral surface 220B.

Figure 4:
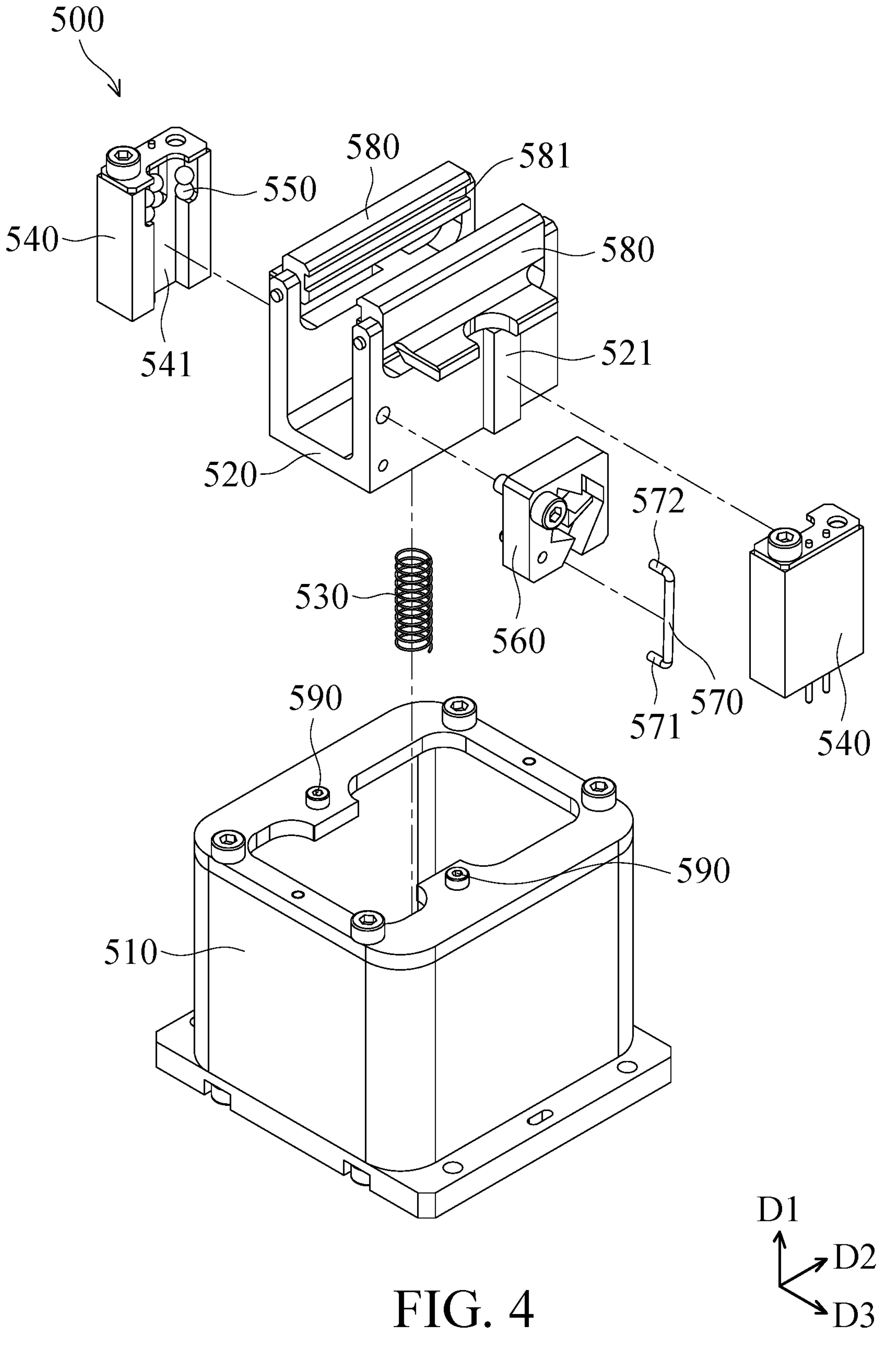
FIG. 4 is an exploded-view diagram of a gripper base according to an embodiment of the invention.

Referring to FIG. 4, the gripper base 500 includes a housing 510, a movable member 520, an elastic member 530, at least one guiding member 540, a plurality of balls 550, a position restricting mechanism 560, a guiding rod 570, at least one engaging member 580, and at least one driving member 590.

The housing 510 can be a hollow box, and the elastic member 530 can be disposed in the housing 510. The elastic member 530 is connected to the housing 510 and the movable member 520, so as to movably connect the movable member 520 to the housing 510. For example, the elastic member 530 can be a compression spring.

The guiding member 540 is affixed to the housing 510, and includes a guiding slot 541. A sliding portion 521 is formed on the side surface of the movable member 520 corresponding to the guiding member 540, and the sliding portion 521 is slidably disposed in the guiding slot 541. Since the longitudinal direction of the guiding slot 541 is substantially parallel to the first direction D1, the movable member 520 can be restricted in that it can only slide along the first direction D1. In this embodiment, a plurality of balls 550 are disposed on the guiding member 540, and when the sliding portion 521 of the movable member 520 enters the guiding slot 541, the balls can be simultaneously in contact with the sliding portion 521 and the guiding member 540, so as to reduce the resistance when the sliding portion 521 slides.

Figure 5:
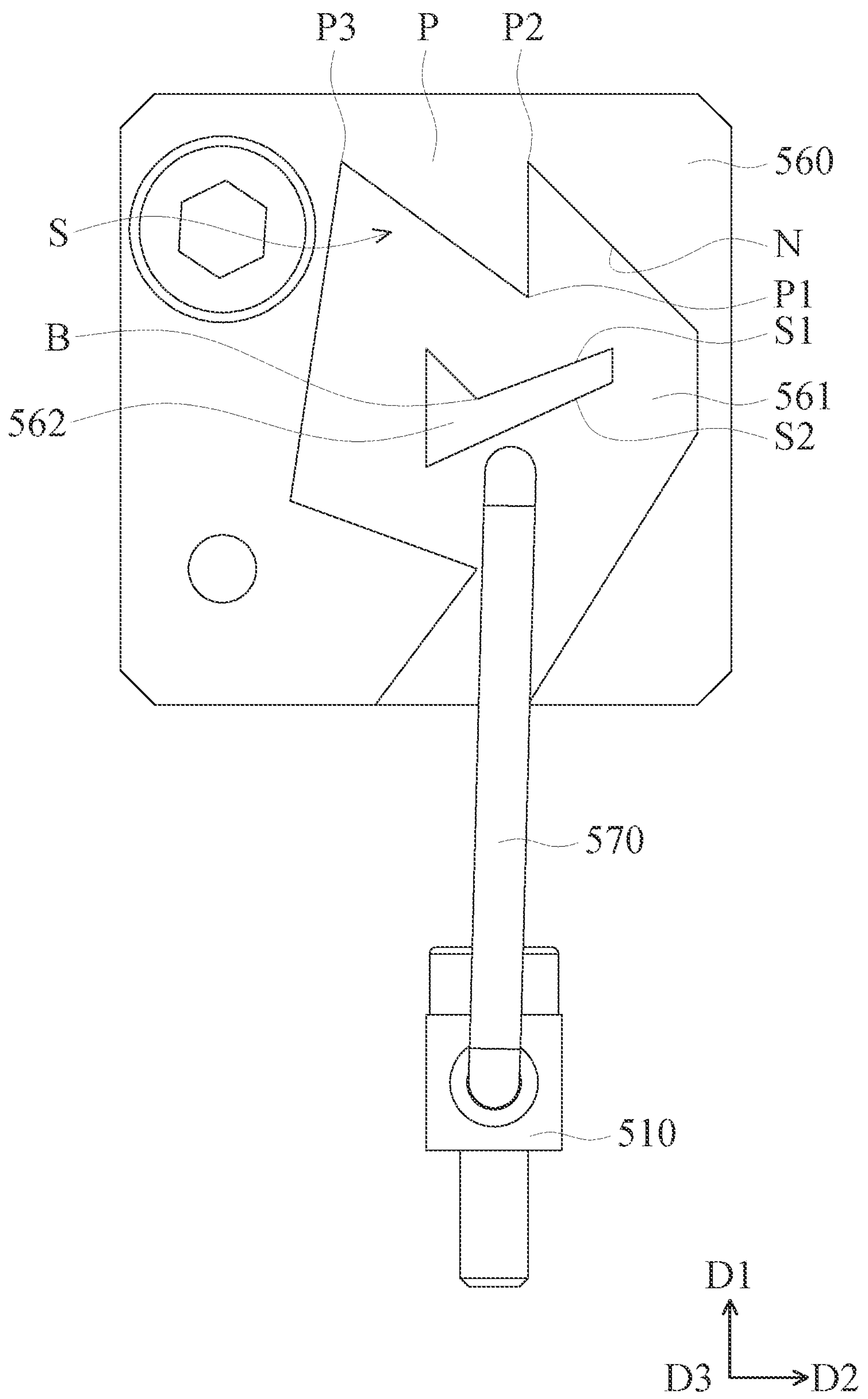
FIG. 5 is a schematic diagram of a position restricting mechanism and a guiding rod according to an embodiment of the invention.

Referring to FIG. 4 and FIG. 5, the position restricting mechanism 560 is affixed to the movable member 520, and includes a groove 561 and a block 562. The groove 561 surrounds the block 562 and has a top surface S. The top surface S has a protrusion P protruding toward the block 562 and an inclined surface N connected to the protrusion P. In detail, the protrusion P has a top end P1 and two bottom ends P2 (the first bottom end) and P3 (the second bottom end), and the distance between the block 562 and the top end P1 is less than that between the block 562 and the bottom end P2 or P3. As seen from the first axis D1, the top end P1 and the bottom end P2 overlap the block 562, and the bottom end P3 is separated from the block 562. The inclined surface N is connected to the first bottom end P2. In this embodiment, the . protrusion P substantially has a triangular structure.

The block 562 has an upper surface S1 and a lower surface S2, wherein the upper surface S1 faces the top surface S, and the lower surface S2 is opposite to the upper surface S1. The. upper surface S1 has a concave structure, and the bottommost portion of the concave structure forms a bottom end B. In this embodiment, as seen from the first axis D1, the top end P1 of the protrusion P is not aligned with the bottom end B of the concave structure, so that a distance is formed between the top end P1 and the bottom end B, and the top end P1 is disposed between the bottom end B and the inclined surface N. The lower surface S2 is a slope surface, and both the lower surface S and the inclined surface N are inclined relative to a second axis D2 that is perpendicular to the first axis D1. It should be noted that, as shown in FIG. 5, the lower surface S2 is inclined from bottom-left to top-right, and the inclined surface N is inclined from bottom-right to top-left. Thus, the inclined direction of the lower surface S2 is different from the inclined direction of the inclined surface N.

As shown in FIG. 4 and FIG. 5, an end 571 of the guiding rod 570 is pivotally connected to the housing 510, and the other end 572 of the guiding rod 570 is movably disposed in the groove 561 of the position restricting mechanism 560. The engaging member 580 is pivotally connected to the movable member 520 and has an engaging slot 581. The longitudinal axis of the engaging slot 581 is parallel to the second axis D2, and the second direction D2 is substantially perpendicular to the first axis D1 and the third axis D3. The driving member 590 is disposed on the housing 510, and extended into the inner of the housing 510. For example, the driving member 590 can be a screw or a spring, but it is not limited thereto. In some embodiments, the driving member 590 can be a part of the housing 510. In other words, the driving member 590 and the housing 510 can be integrally formed as one piece.

Figure 6A:
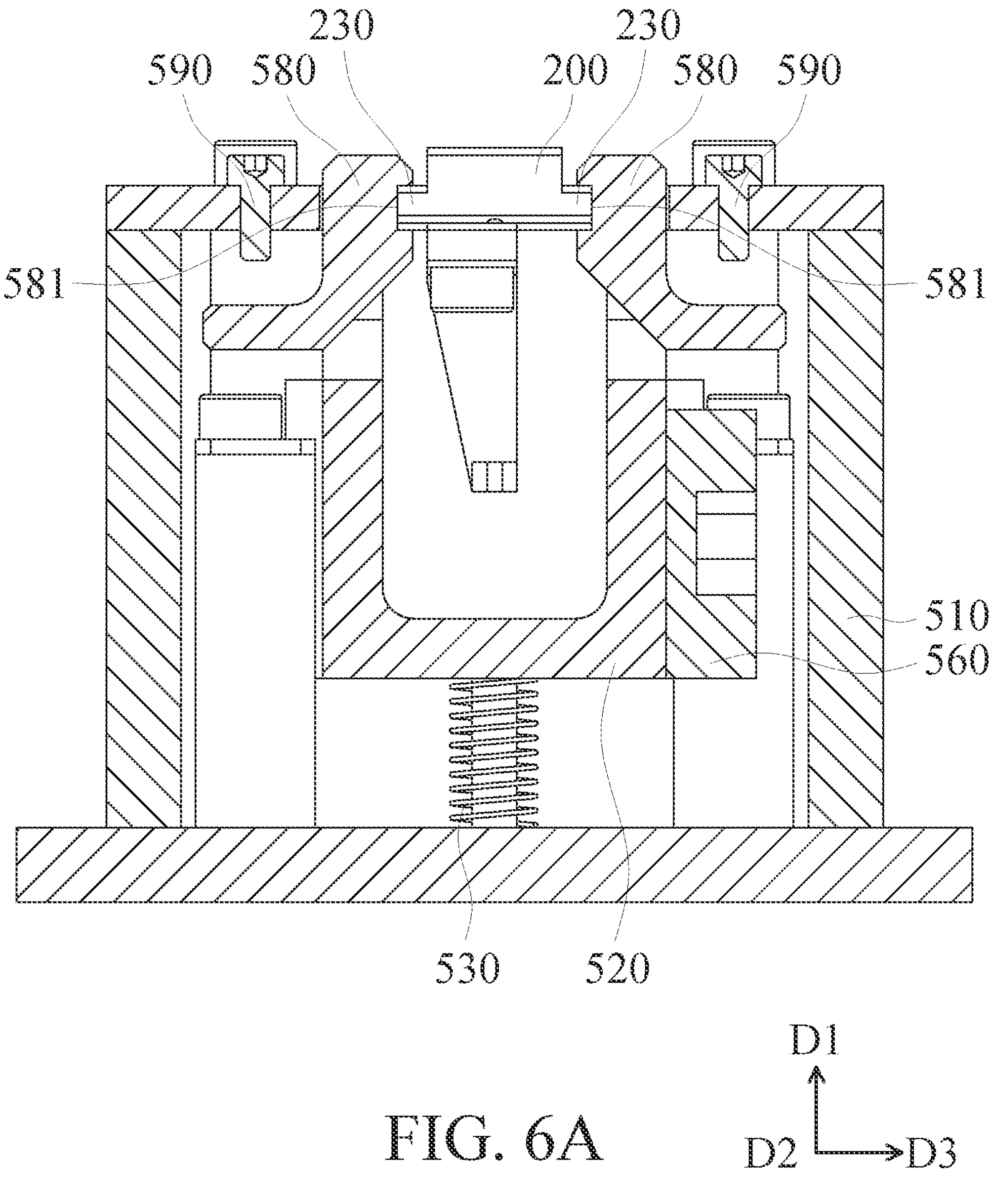
FIG. 6A is a schematic diagram representing that the claw flake is disposed on the gripper base according to an embodiment of the invention.
Figure 6B:
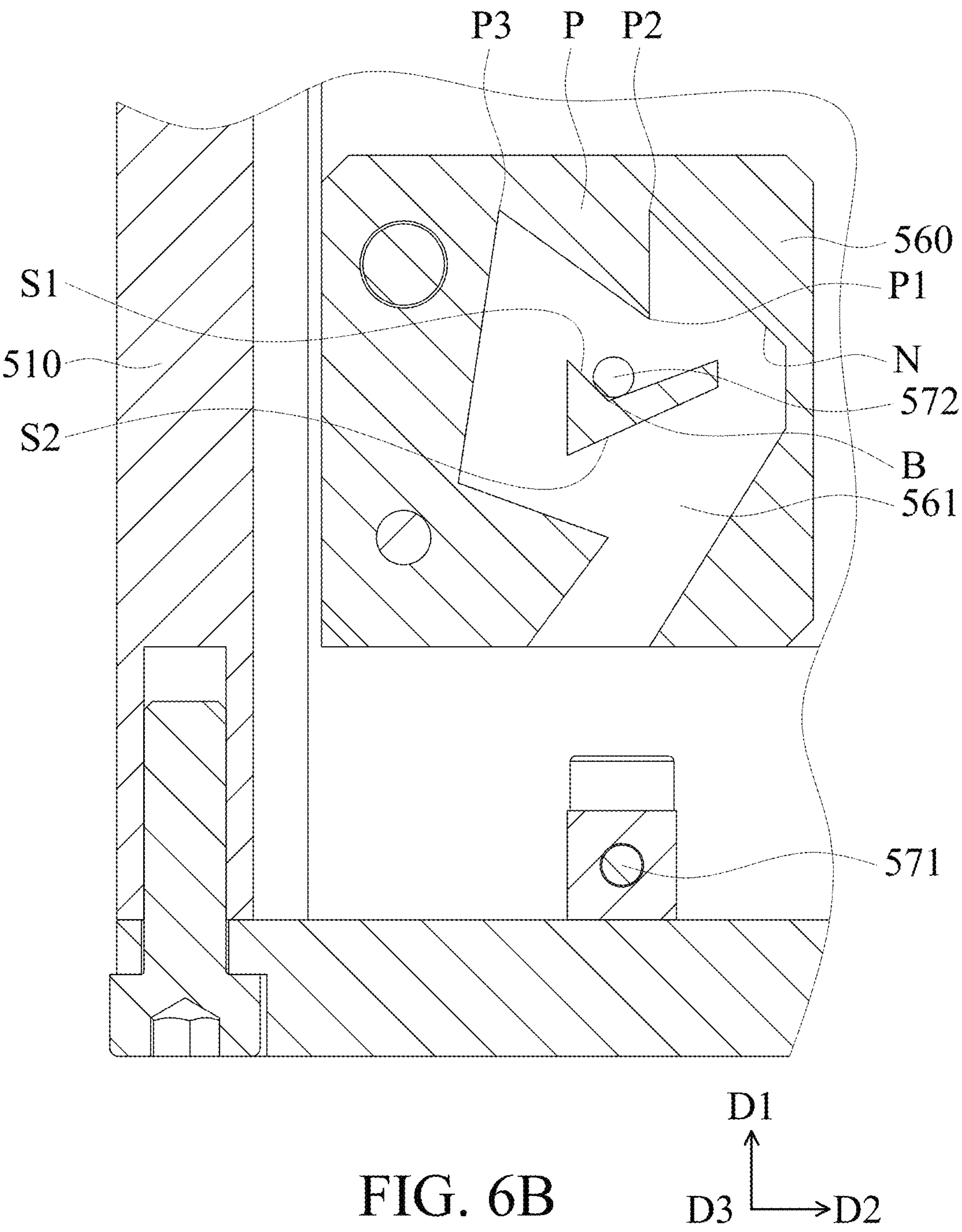
FIG. 6B is a schematic diagram representing that one end of the guiding rod is in a first position according to an embodiment of the invention.

The operating method of the gripper system C is discussed below. First, as shown in FIG. 6A and FIG. 6B, when the claw flake 200 is affixed to the gripper base 500 via the engaging member 580, the engaging member 580 is at a closed angle, and the protruding portion 230 is accommodated in the engaging slot 581 of the engaging member 580. Since the elastic member 530 provides an upward elastic force to the movable member 520, the end 572 of the guiding rod 570 can be affixed in the first position of the groove 561. In detail, when the end 572 of the guiding rod 570 is in the first position of the groove 561, the end 572 of the guiding rod 570 is in contact with the concave structure of the upper surface S1 of the block 562 and adjacent to its bottom end B.

Figure 6C:
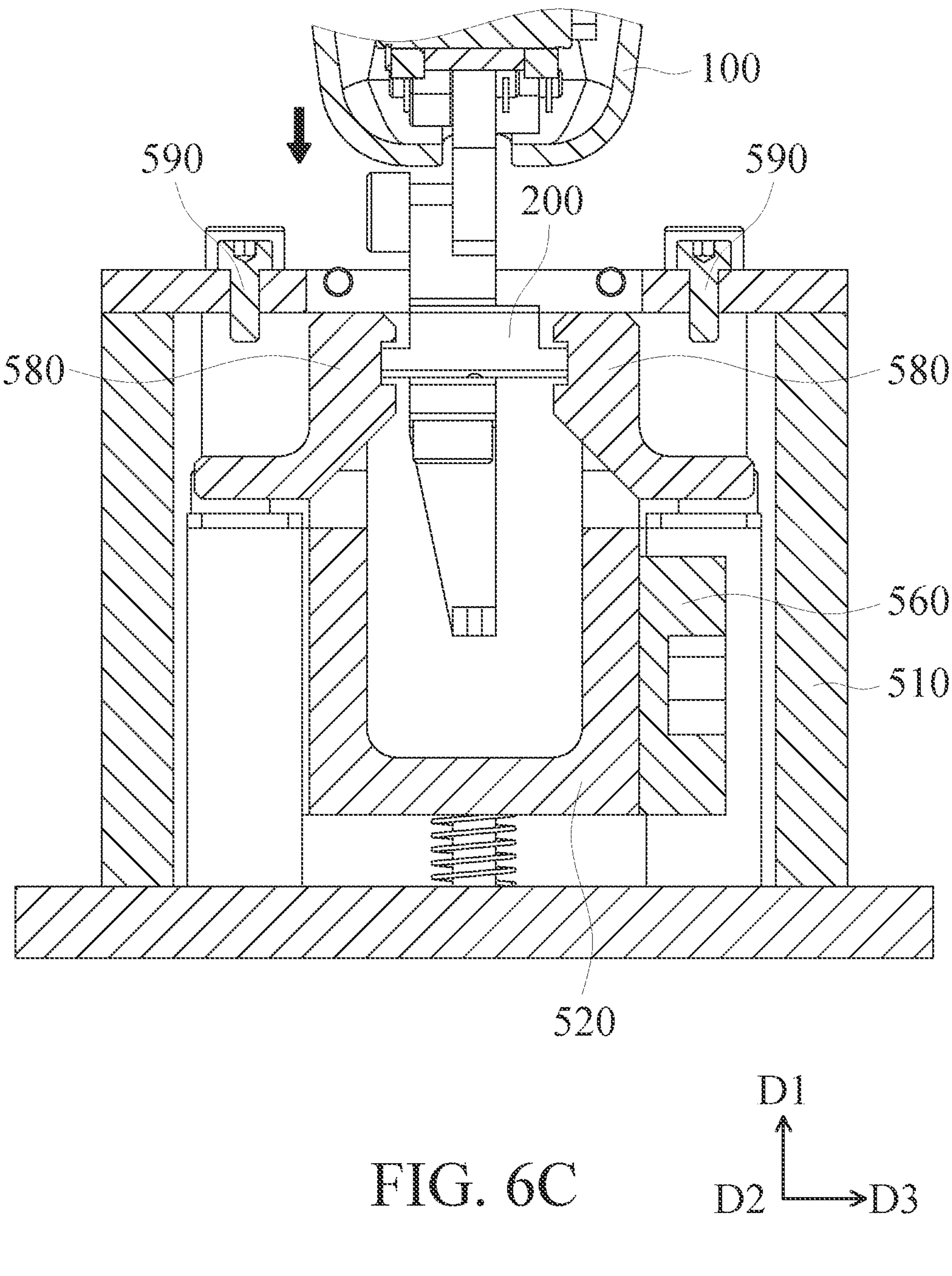
FIG. 6C is a schematic diagram representing that the gripper device moves toward the gripper base along a first axis according to an embodiment of the invention.
Figure 6D:
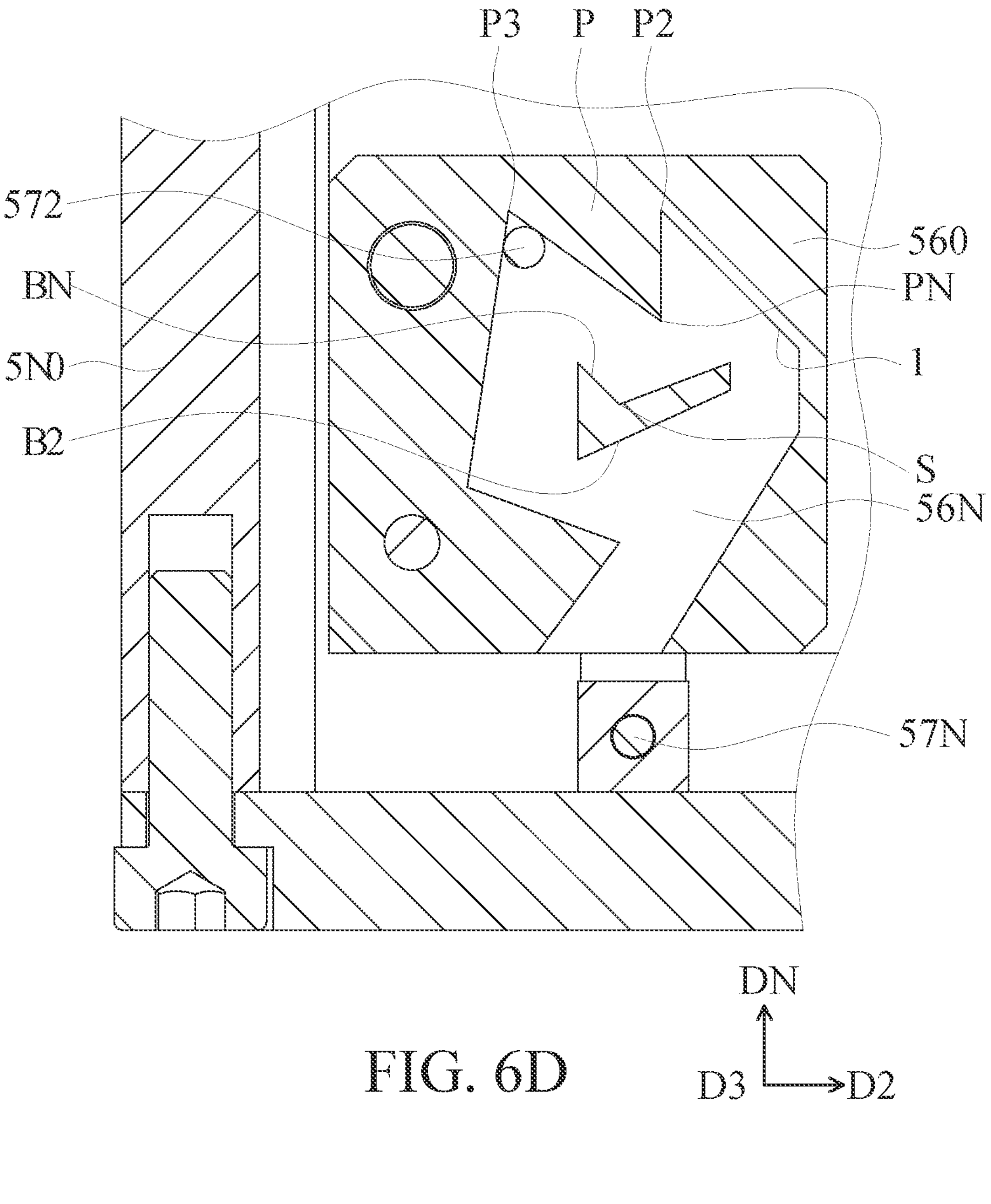
FIG. 6D is a schematic diagram representing that the end of the guiding rod moves to a first temporary position according to an embodiment of the invention.

As shown in FIG. 6C and FIG. 6D, when the user wants to connect the claw flake 200 to the gripper device 100, the gripper device 100 can move toward the gripper base 500 along the first axis D1, and the claw flake 200 and the gripper device 100 can be connected to each other by the magnetic attracting force between the first connecting member 300 and the second connecting member 400. The movable member 520 and the engaging member 580 move downwardly due to the pushing force of the gripper device 100, and the end 572 of the guiding rod 570 can move to a first temporary position of the groove 561. When the end 572 of the guiding rod 570 is in the first temporary position of the groove 561, the end 572 of the guiding rod 570 is in contact with the top surface S of the groove 561 and adjacent to the bottom end P3.

Figure 6E:
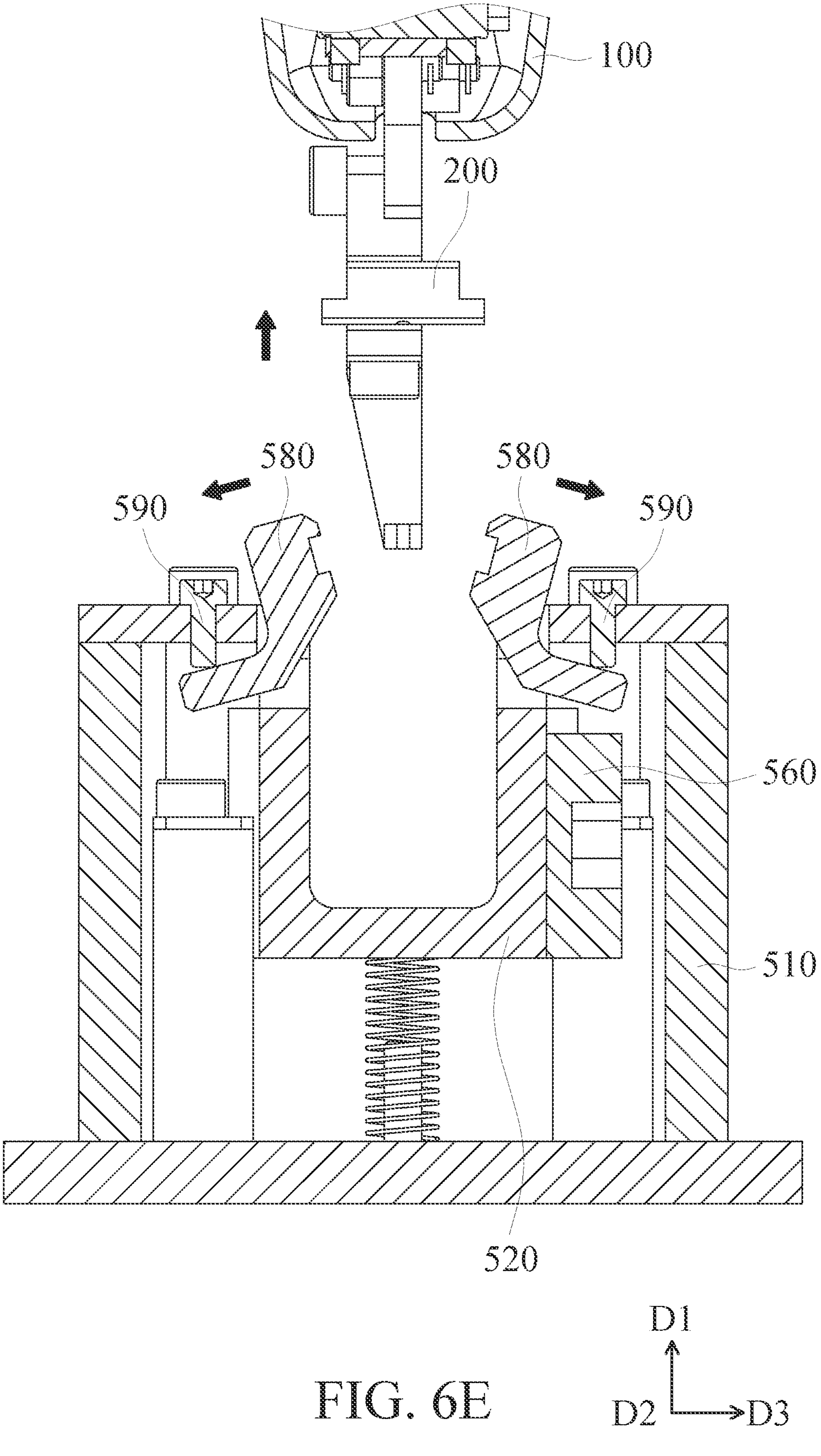
FIG. 6E is a schematic diagram representing that the gripper device brings the claw flake to move away from the gripper base along the first axis according to an embodiment of the invention.
Figure 6F:
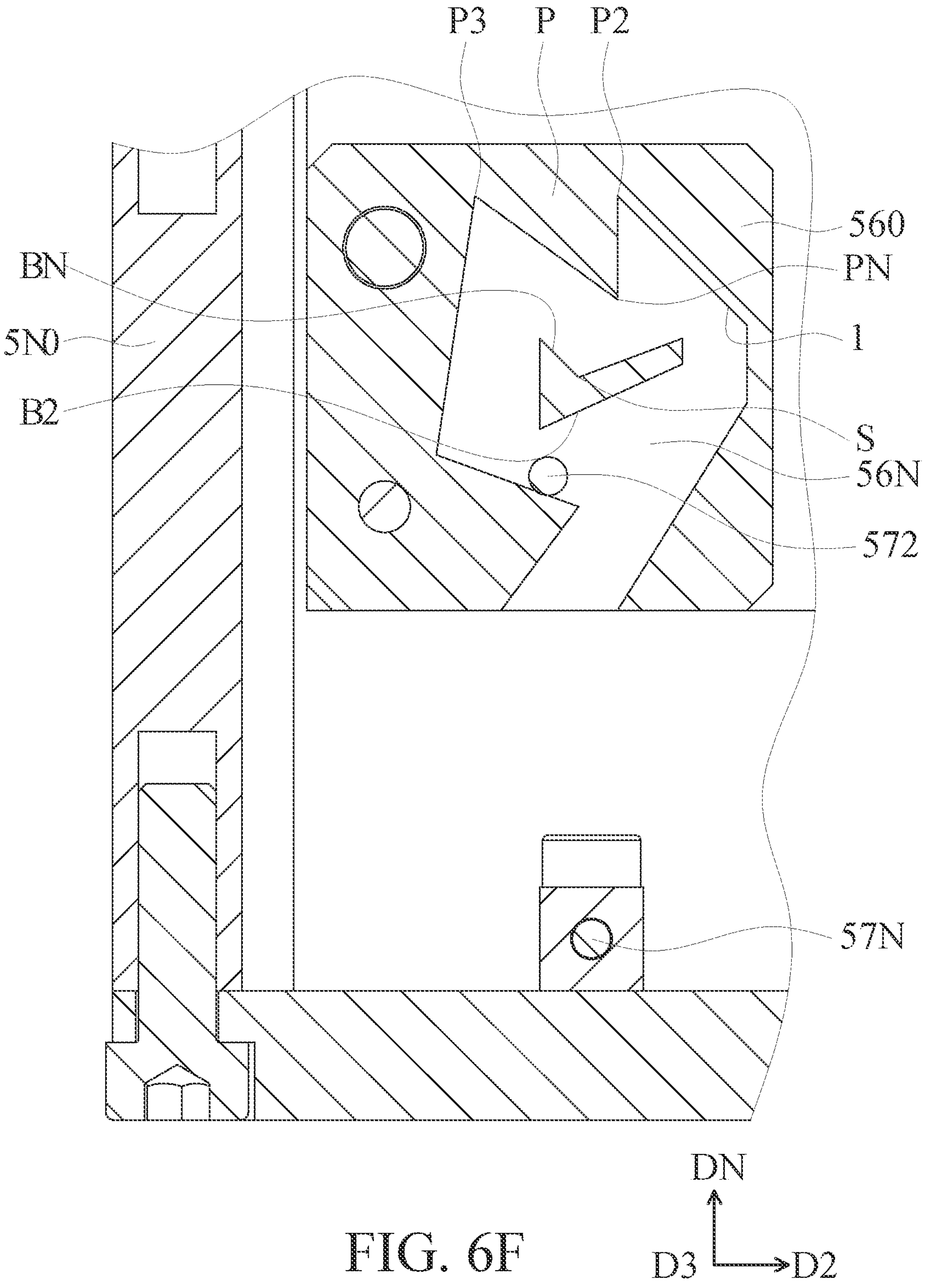
FIG. 6F is a schematic diagram representing that the end of the guiding rod moves to a second position according to an embodiment of the invention.

Subsequently, as shown in FIG. 6E and FIG. 6F, the gripper device 100 can move away from the gripper base 500 along the first axis D1. Since the gripper device 100 does not provide the downward pushing force to the movable member 520 anymore, the movable member 520 moves upwardly again due to the elastic force of the elastic member 530. Because the inclined direction of the guiding rod 570 is the same as the inclined direction of the inclined surface N when the end 572 of the guiding rod 570 is in the first temporary position, and the bottom end P3 is separated from the block 562 as seen from the first axis D1, the end 572 of the guiding rod 570 can move to a second position of the groove that is below the block 562. The movement of the movable member 520 is not restricted by the position restricting mechanism 560, so that the movable member 520 can move upwardly relative to the housing 510 to a higher position than before.

When the engaging member 580 moves upwardly along the first axis D1 along with the movable member 520, it is in contact with the driving member 590. The driving member 590 can push the engaging member 580 to rotate from the closed angle to an open angle. Therefore, the claw flake 200 can be separated from the engaging member 580, and the gripper device 100 can move the claw flake 200 to a desired position to grab the object.

Figure 6G:
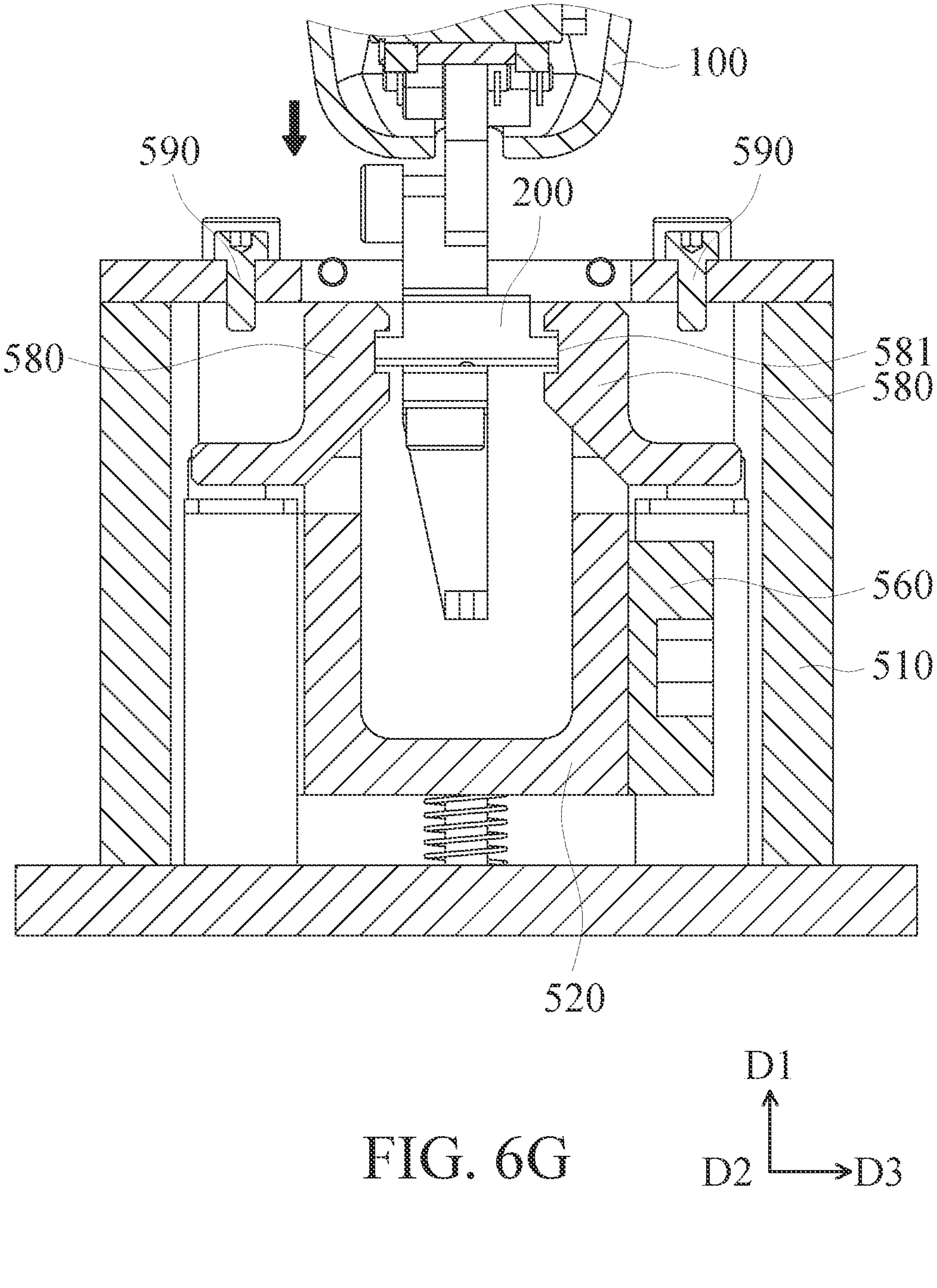
FIG. 6G is a schematic diagram representing that the gripper device brings the claw flake to move toward the gripper base along the first axis according to an embodiment of the invention.
Figure 6H:
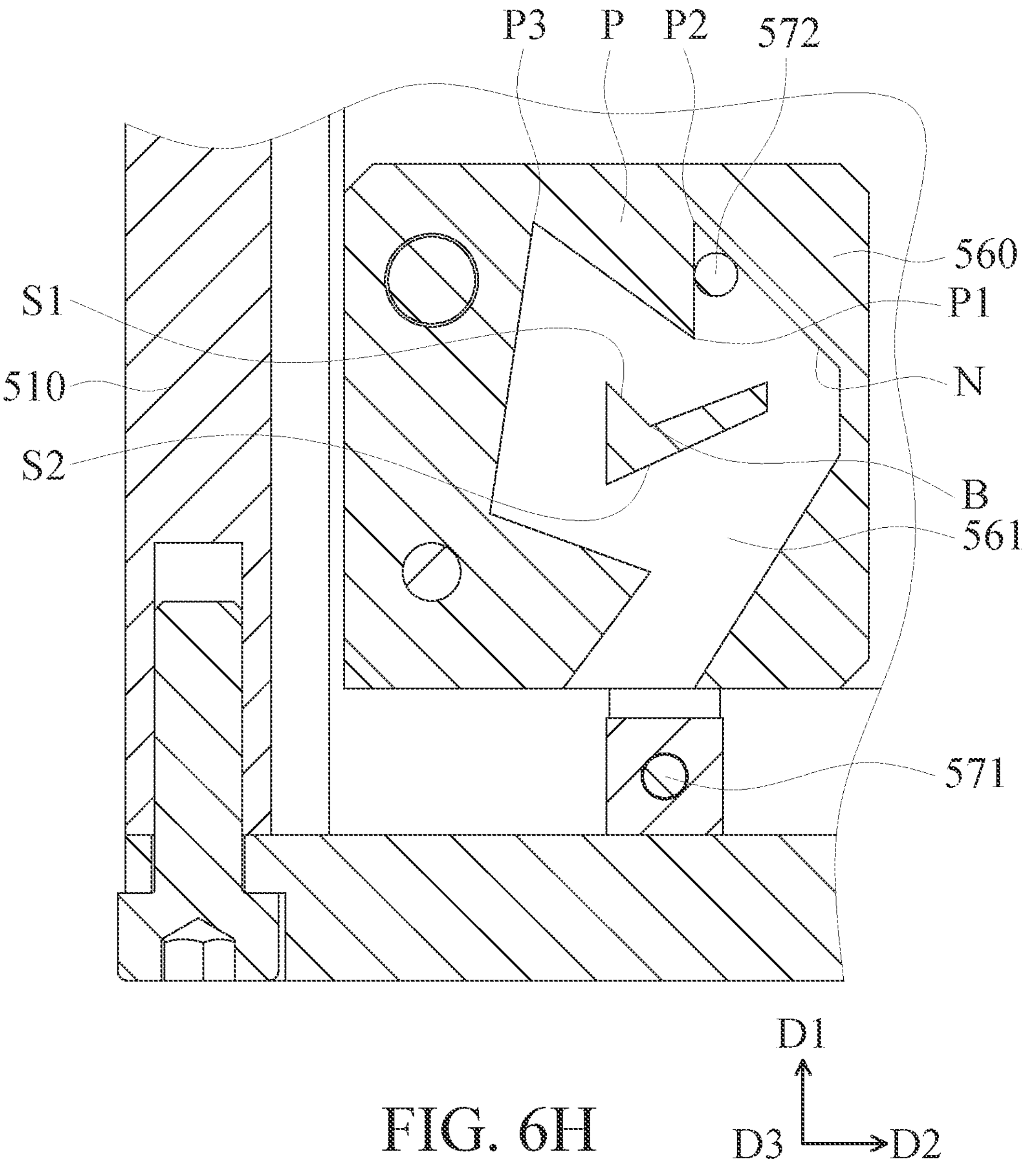
FIG. 6H is a schematic diagram representing that the end of the guiding rod moves to a second temporary position according to an embodiment of the invention.

Referring to FIG. 6G and FIG. 6H, when the user wants to affix the claw flake 200 on the gripper device 100 to the gripper base 500, the gripper device 100 with the claw flake 200 can move toward the gripper base 500 along the first axis D1. The protruding portion 230 of the claw flake 200 is engaged with the engaging slot 581 of the engaging member 580 and pushes the engaging member 580 from the open angle to the closed angle.

The end 572 of the guiding rod 570 can move along the lower surface S2 of the block 562 and the inclined surface N of the groove 561 to a second temporary position adjacent to the bottom end P2.

Figure 6I:
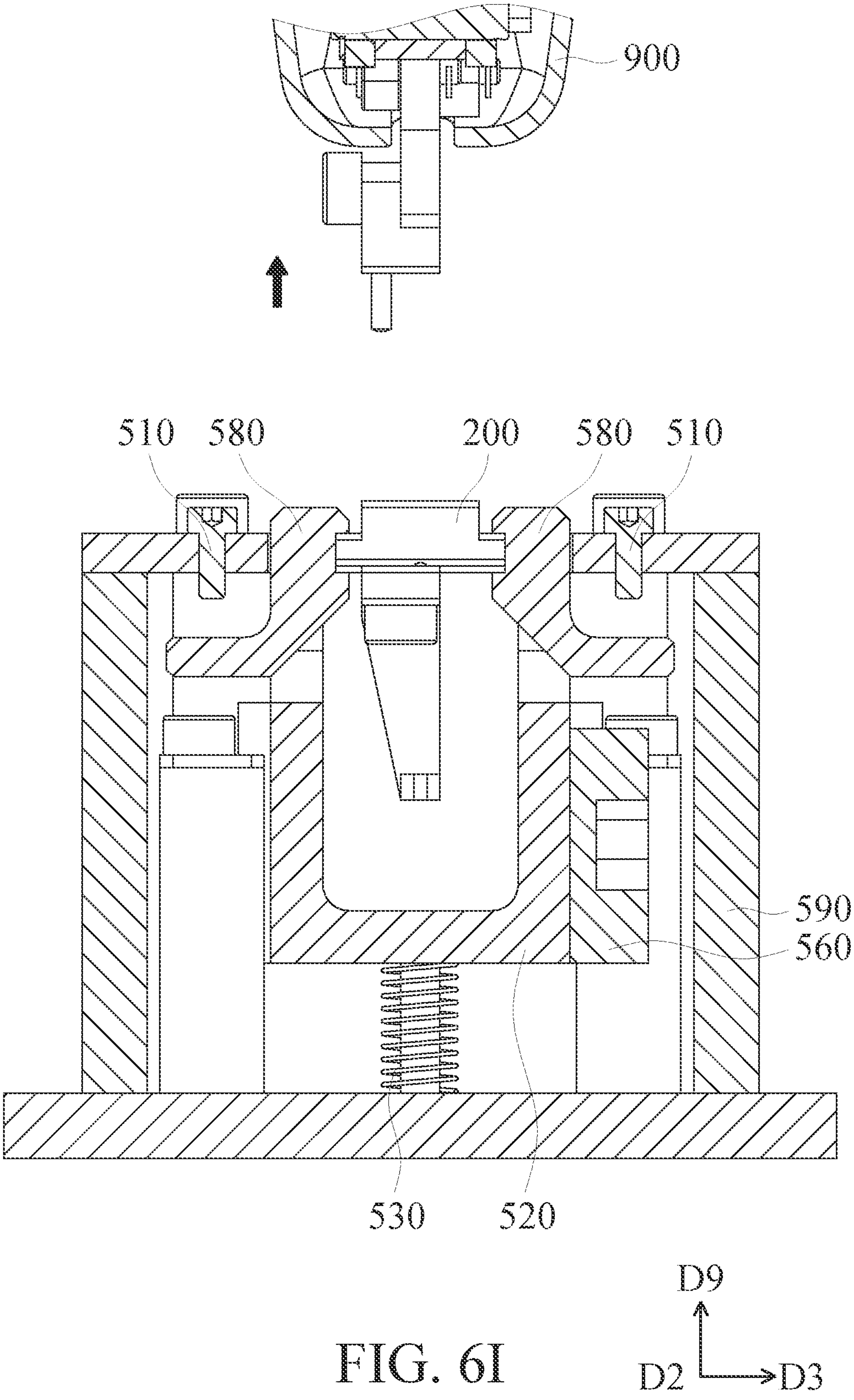
FIG. 6I is a schematic diagram representing that the gripper device moves away from the gripper base along the first axis and is separated from the claw flake according to an embodiment of the invention.
Figure 6J:
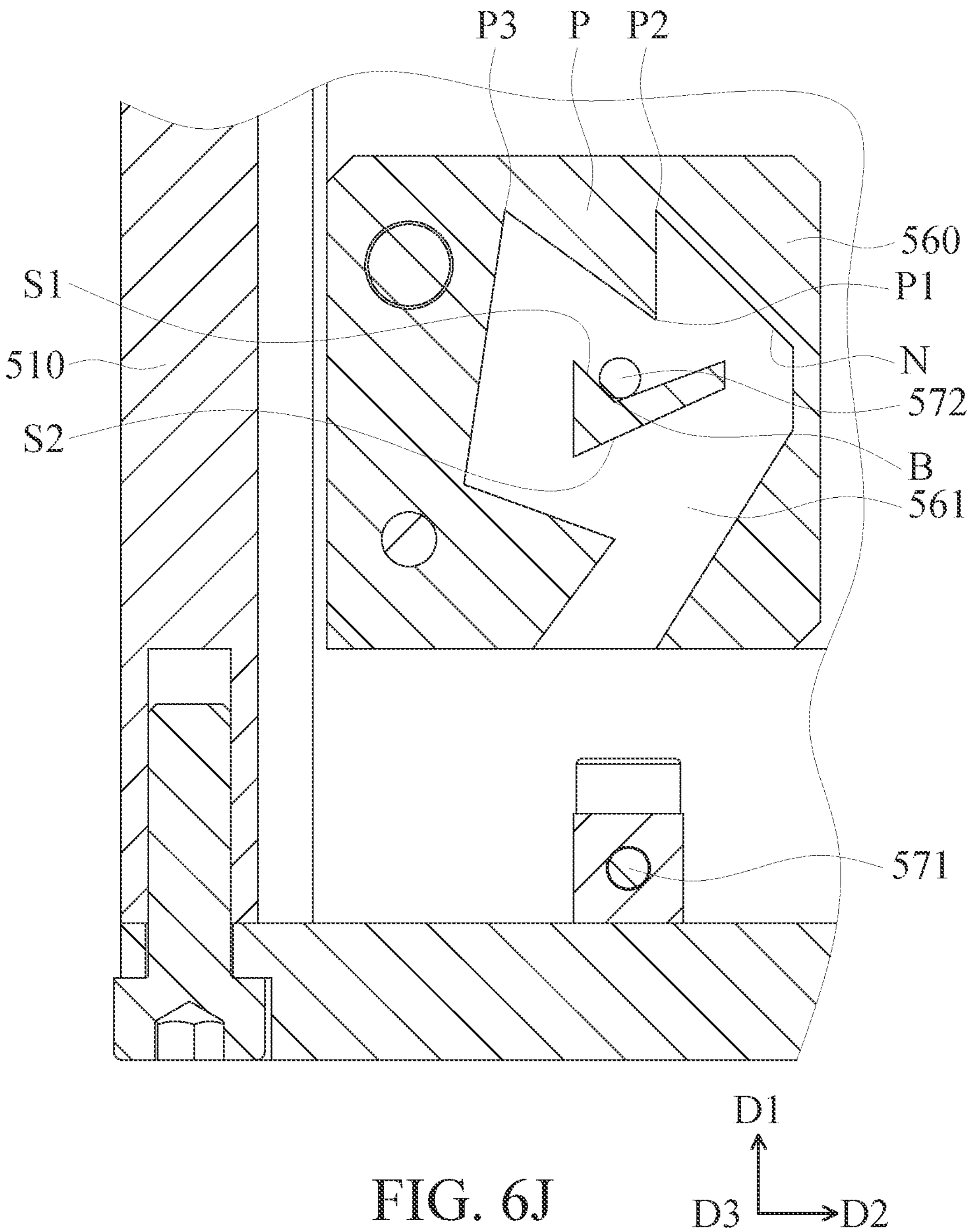
FIG. 6J is a schematic diagram representing that the end of the guiding rod moves back to the first position according to an embodiment of the invention.

Finally, as shown in FIG. 6I and FIG. 6J, the gripper device 100 can move away from the gripper base 500 along the first axis D1. Since the gripper device 100 does not provide the downward pushing force anymore, the movable member 520 moves upwardly again due to the elastic force of the elastic member 530. The end 572 of the guiding rod 570 moves to the first position and is affixed to the first position.

Since the claw flake 200 is affixed to the gripper base 500 by the engaging member 580, the claw flake 200 can be separated from the gripper device 100 when the gripper device 100 moves away from the gripper base 500 along the first axis D1.

In summary, a gripper base is provided, including a housing, a movable member, an elastic member, a position restricting mechanism, a guiding rod, and an engaging member. The elastic member is connected to the housing and the movable member. The position restricting mechanism is disposed on the movable member, and includes a groove and a block, wherein the groove surrounds the block. The groove has a top surface, and the block has an upper surface facing the top surface. The top surface has a protrusion protruding toward the block, and the upper surface has a concave structure. One end of the guiding rod is pivotally connected to the housing, and the other end of the guiding rod enters the groove. The engaging member is pivotally connected to the movable member.

A gripper system is also provided, including the aforementioned gripper base, a gripper device, a first connecting member, a claw flake, and a second connecting member. The claw flake has a protruding portion. The first connecting member and the second connecting member are respectively disposed on the gripper device and the claw flake, and the claw flake is detachably connected to the gripper device via a magnetic attracting force between the first connecting member and the second connecting member. When the gripper device brings the claw flake to move toward the gripper base along a first axis, the claw flake contacts and pushes the engaging member from an open angle to a closed angle, and the engaging member affixes the claw flake to the gripper base.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A gripper base, comprising:

a housing;

a movable member;

an elastic member, connected to the housing and the movable member;

a position restricting mechanism, disposed on the movable member, comprising:

a groove, having a top surface; and a block, having an upper surface facing the top surface, wherein the groove surrounds the block, the top surface has a protrusion protruding toward the block, and the upper surface has a concave structure, wherein the protrusion has a first bottom end, and the first bottom end includes an acute angle structure;

a guiding rod, wherein one end of the guiding rod is pivotally connected to the housing, and another end of the guiding rod enters the groove; and an engaging member, pivotally connected to the movable member.

2. The gripper base as claimed in claim 1, wherein the protrusion has a top end, the concave structure has a bottom end, and the movable member is movable along a first axis relative to the housing, wherein as seen from the first axis, a distance is formed between the top end and the bottom end.

3. The gripper base as claimed in claim 1, wherein the protrusion has a second bottom end, and the movable member is movable along a first axis relative to the housing, wherein as seen from the first axis, the first bottom end overlaps the concave structure, and the second bottom end is separated from the concave structure.

4. The gripper base as claimed in claim 3, wherein the groove has an inclined surface connected to the first bottom end and inclined relative to a second axis, and the second axis is substantially perpendicular to the first axis.

5. The gripper base as claimed in claim 4, wherein the block further comprises a lower surface opposite to the upper surface, the lower surface and the inclined surface slant in opposite directions, and in the first axis, the lower surface overlaps the inclined surface.

6. The gripper base as claimed in claim 4, wherein the block further comprises a lower surface opposite to the upper surface, the lower surface and the inclined surface slant in opposite directions, and in the second axis, a width of the lower surface is substantially the same as a width of the concave structure on the upper surface.

7. The gripper base as claimed in claim 1, wherein the block further comprises a lower surface opposite to the upper surface, and the movable member is movable along a first axis relative to the housing, wherein the lower surface is inclined relative to a second axis, and the second axis is substantially perpendicular to the first axis.

8. The gripper base as claimed in claim 1, wherein the gripper base further comprises a driving member disposed on the housing, wherein when the guiding rod is in a first position of the groove, the engaging member is at a closed angle relative to the housing, and when the guiding rod moves from the first position to a second position of the groove, the driving member contacts and pushes the engaging member, and the engaging member rotates from the closed angle to an open angle.

9. The gripper base as claimed in claim 8, wherein the concave structure has a bottom end, and when the guiding rod is in the first position of the groove, the guiding rod is in contact with the concave structure and adjacent to the bottom end.

10. The gripper base as claimed in claim 1, wherein the gripper base further comprises a guiding member, disposed on the housing and having a guiding slot, wherein the movable member has a sliding portion, slidably disposed in the guiding slot.

11. The gripper base as claimed in claim 10, wherein the gripper base further comprises a plurality of balls, and the balls are in contact with the movable member and the sliding portion.

12. A gripper system, comprising:
- a gripper device;
- at least one connecting member, disposed on the gripper device;
- at least one claw flake, having a protruding portion;
- a second connecting member, disposed on the claw flake, wherein the flake is detachably connected to the gripper device via a magnetic attracting force between the first connecting member and the second connecting member; and
- a gripper base, comprising:
  - a housing;
  - a movable member;
  - an elastic member, connected to the housing and the movable member;
  - a position restricting mechanism, disposed on the movable member, comprising:
  - a groove, having a top surface; and
  - a block, having an upper surface facing the top surface, wherein the groove surrounds the block, the top surface has a protrusion protruding toward the block, and the upper surface has a concave structure;
- a guiding rod, wherein one end of the guiding rod is pivotally connected to the housing, and the other end of the guiding rod enters the groove; and
- an engaging member, pivotally connected to the movable member;
- wherein when the gripper device brings the claw flake to move toward the gripper base along a first axis, the claw flake contacts and pushes the engaging member from an open angle to a closed angle, and the engaging member affixes the claw flake to the gripper base.

13. The gripper system as claimed in claim 12, wherein when the engaging member affixes the claw flake to the gripper base, and the gripper device moves away from the gripper base, the claw flake is separated from the gripper device.

* * * * *